(12) United States Patent
Acharya et al.

(10) Patent No.: US 7,592,079 B1
(45) Date of Patent: Sep. 22, 2009

(54) METHOD TO IMPROVE REMANENCE-SQUARENESS-THICKNESS-PRODUCT AND COERCIVITY PROFILES IN MAGNETIC MEDIA

(75) Inventors: B. Ramamurthy Acharya, Cupertino, CA (US); Gunn Choe, San Jose, CA (US)

(73) Assignee: Seagate Technology LLC, Scotts Valley, CA (US)

(*) Notice: Subject to any disclaimer, the term of this patent is extended or adjusted under 35 U.S.C. 154(b) by 728 days.

(21) Appl. No.: 10/884,789

(22) Filed: Jul. 1, 2004

Related U.S. Application Data

(60) Provisional application No. 60/484,940, filed on Jul. 3, 2003.

(51) Int. Cl.
G11B 5/66 (2006.01)
(52) U.S. Cl. ............... 428/827; 428/829; 428/830
(58) Field of Classification Search .............. None
See application file for complete search history.

(56) References Cited

U.S. PATENT DOCUMENTS

| | | | |
|---|---|---|---|
| 4,522,848 A | 6/1985 | Patel | 427/131 |
| 4,610,911 A | 9/1986 | Opfer et al. | 428/213 |
| 4,663,009 A | 5/1987 | Bloomquist et al. | 204/192.2 |
| 4,929,514 A | 5/1990 | Natarajan et al. | 428/611 |
| 5,051,288 A | 9/1991 | Ahlert et al. | 428/64 |
| 5,149,409 A | 9/1992 | Ahlert et al. | 204/192.2 |
| 5,324,593 A | 6/1994 | Lal et al. | 428/610 |
| 5,393,584 A * | 2/1995 | Satoh et al. | 428/848.8 |
| 5,432,012 A | 7/1995 | Lal et al. | 428/610 |
| 5,520,981 A | 5/1996 | Yang et al. | 428/65.5 |
| 5,701,223 A | 12/1997 | Fontana, Jr. et al. | 360/113 |
| 5,707,706 A | 1/1998 | Fukaya et al. | 428/65.3 |
| 5,723,032 A | 3/1998 | Yamaguchi et al. | 204/192.2 |
| 5,763,071 A | 6/1998 | Chen et al. | 428/332 |
| 5,840,394 A | 11/1998 | Ranjan et al. | 428/65.3 |
| 5,900,324 A | 5/1999 | Moroishi et al. | 428/611 |

(Continued)

FOREIGN PATENT DOCUMENTS

| | | | |
|---|---|---|---|
| JP | 58-062829 A | | 4/1983 |
| JP | 60-101720 A | | 6/1985 |
| JP | 05-189738 A | | 7/1993 |
| JP | 06-215344 A | | 8/1994 |
| JP | 11-339256 A | * | 12/1999 |

OTHER PUBLICATIONS

JPO Abstract Translation of JP 11-339256-A (JPO Pat-No. JP411339256A).*

(Continued)

*Primary Examiner*—Kevin M. Bernatz
(74) *Attorney, Agent, or Firm*—Wax Law Group

(57) ABSTRACT

A magnetic disk for information storage that includes a substrate and an information layer for containing information. The information layer includes a upper (e.g., recording) and lower (e.g., stabilizing) layers. The information layer has a remanence-squareness-thickness-product ("Mrt") that varies radially between first and second disk radii. At least one of the following conditions is true: (i) the information layer has a coercivity that is at least substantially constant between the first and second disk radii; (ii) the lower magnetic layer has a magnetic anisotropy energy of no more than about $1.5 \times 10^6$ erg/cm$^3$; and (iii) the magnetic anisotropy energy of the upper magnetic layer is at least about 150% of the magnetic anisotropy energy of the lower magnetic layer.

25 Claims, 16 Drawing Sheets

U.S. PATENT DOCUMENTS

| | | | | |
|---|---|---|---|---|
| 6,007,924 | A | 12/1999 | Lal et al. | 428/611 |
| 6,153,320 | A | 11/2000 | Parkin | 428/693 |
| 6,156,422 | A | 12/2000 | Wu et al. | 428/332 |
| 6,210,819 | B1 | 4/2001 | Lal et al. | 428/694 T |
| 6,280,813 | B1 | 8/2001 | Carey et al. | 428/65.3 |
| 6,326,637 | B1 | 12/2001 | Parkin et al. | 257/9 |
| 6,372,330 | B1 | 4/2002 | Do et al. | 428/212 |
| 6,383,668 | B1 | 5/2002 | Fullerton et al. | 428/694 |
| 6,602,612 | B2 | 8/2003 | Abarra et al. | 428/611 |
| 6,610,424 | B1 | 8/2003 | Acharya et al. | 428/694 TM |
| 6,641,935 | B1 | 11/2003 | Li et al. | 428/694 TS |
| 6,677,051 | B1 | 1/2004 | Acharya et al. | 428/611 |
| 6,808,783 | B1 * | 10/2004 | Lin et al. | 428/832 |
| 6,830,824 | B2 * | 12/2004 | Kikitsu et al. | 428/828.1 |
| 7,070,870 | B2 * | 7/2006 | Bertero et al. | 428/828 |
| 7,118,815 | B2 * | 10/2006 | Ji et al. | 428/827 |
| 2001/0038931 | A1 | 11/2001 | Carey et al. | 428/694 |
| 2002/0028356 | A1 | 3/2002 | Kawato et al. | 428/694 |
| 2002/0028357 | A1 | 3/2002 | Shukh et al. | 428/694 |
| 2002/0045070 | A1 | 4/2002 | Sakakima et al. | 428/694 |
| 2002/0064689 | A1 | 5/2002 | Yamanaka et al. | 428/694 TM |
| 2002/0114978 | A1 | 8/2002 | Chang et al. | 428/694 TM |
| 2003/0104253 | A1 | 6/2003 | Osawa et al. | 428/694 TM |
| 2003/0148143 | A1 | 8/2003 | Kanbe et al. | 428/694 TS |

OTHER PUBLICATIONS

Machine Translation of JP 11-339356-A.*

JPO Abstract Translation of JP 11-339256-A (JPO Pat-No. JP411339256 A) (1999).*

Machine Translation of JP 11-339356-A (1999).*

U.S. Appl. No. 10/052,621, filed Jan. 17, 2002, Lin et al.

U.S. Appl. No. 10/227,019, filed Aug. 23, 2002, Zhou et al.

Abstracts, 46th Annual Conference on Magnetism & Magnetic Materials, Seattle, Washington, Nov. 12-16, 2001, pp. 180-181, 351.

E.N. Abarra et al., "Longitudinal Magnetic Recording Media with Thermal Stabilization Layers," *Applied Physics Letters*, vol. 77, No. 16 (Oct. 16, 2000), pp. 2581-2583.

Eric E. Fullterton et al., "Antiferromagnetically Coupled Magnetic Medial Layers for Thermally Stable High-Density Recording," *Applied Physics Letters*, vol. 77, No. 23 (Dec. 4, 2000), pp. 3806-3808.

H. Yamanaka et al., "Enhancement of Exchange Coupling for Antiferromagnetically Coupled Media," *Applied Physics Letters*, vol. 91, No. 10 (May 15, 2002), pp. 8614-8616.

Z. S. Shan et al., "Effects of Inserting Thin Co Layers on the Magnetic and Reversal Properties of Synthetic Antiferromagnetically coupled media," *Applied Physics Letters*, vol. 91, No. 10 (May 15, 2002), pp. 7682-7684.

Er. Girt et al., "Different Designs and Limits of Longitudinal Magnetic Recording Media," *Applied Physics Letters*, vol. 91, No. .10 (May 15, 2002), pp. 7679-7681.

A. Inomata et al., "Advanced Synthetic Ferrimagnetic Media (Invited)," *Applied Physics Letters*, vol. 91, No. 10 (May 15, 2002), pp. 7671-7675.

"Laminated Antiferromagnetically Coupled (LAC) Recording Media", *Media & Materials: A Research Group of DSI*, at www.dsi.nus.edu.sg/tracks/media/research/LAC%20Media.html (Aug. 21, 2002).

E. Noel Abarra et al., "Synthetic Ferrimagnetic Media," *Fujitsu Sci. Tech. J.*, Vo. 37, No. 2 (Dec. 2001), pp. 145-154.

* cited by examiner

US 7,592,079 B1

METHOD TO IMPROVE REMANENCE-SQUARENESS-THICKNESS-PRODUCT AND COERCIVITY PROFILES IN MAGNETIC MEDIA

CROSS REFERENCE TO RELATED APPLICATIONS

The present application claims the benefits under 35 U.S.C. Section 119(e) of U.S. Provisional Application Ser. No. 60/484,940 to Choe et al., entitled "Method to Fabricate Amplitude Gradient Media for High Data Rate Recording Applications," filed Jul. 3, 2003, which is incorporated herein by this reference.

Cross reference is made to the subject matter of copending U.S. patent application Ser. No. 10/052,621, filed Jan. 17, 2002, to Lin, et al., entitled "Storage Media with Non-Uniform Properties," which is incorporated herein by this reference.

FIELD OF THE INVENTION

The present invention relates generally to information storage media and specifically to magnetic recording media, such as thin-film magnetic disks.

BACKGROUND OF THE INVENTION

Magnetic hard-disk drives ("HDDs") can store and retrieve large amounts of information. The information is commonly stored as a series of bits on a stack of thin-film magnetic disk platters, each of which is an aluminum alloy or glass substrate coated on each side with thin-film magnetic materials layers and one or more protective layers. A bit is identified as a flux transition. Linear bit density is measured as the number of flux transitions per unit length, and areal bit density is measured as the number of flux transitions per unit area. Typically, the higher the linear and areal bit densities, the lower the signal-to-noise ratio. Read-write heads, typically located on both sides of each platter, record and retrieve bits from circumferential tracks on the magnetic disks.

FIG. 1 shows a cross-section of a conventional magnetic disk that uses a laminated information layer 100. The laminated information layer 100 includes upper and lower magnetic layers 104a and b, with the upper layer 104a (CoCr PtB) containing the recorded information. The lower layer 104b (CoCr-alloy) is formed above an underlayer 108 (Cr-alloy), a seed layer 112 (Cr), and a supporting substrate 116. The parallel orientations of the moments 120a and 120b add constructively to provide a high effective magnetic moment for the laminated magnetic layer 100. Average grain diameters are now less than 10 nm. Laminated information layers are further described in U.S. Pat. Nos. 6,007,924; 6,610,424; and 6,677,051, each of which is incorporated herein by this reference.

The use of smaller grain sizes has a detrimental impact on the thermal stability of grain magnetization, particularly at high bit densities where the demagnetizing fields are significant. The equation which determines the stability of a recording medium against thermal fluctuations is $K_u V/k_B T$, where $K_u$ is the magnetic anisotropic energy of the magnetic medium, V is the volume of a magnetic grain, $k_B$ is Boltzmann's constant, and T is the absolute temperature. Magnetic media having higher values for $K_u V/k_B T$ are generally more stable against thermal fluctuations. When magnetic media have lower values and are therefore thermally unstable, increases in temperature can cause loss of stored information through the onset of the superparamagnetic effect. When a magnetic recording layer exhibits superparamagnetic behavior, the layer, in the remanent state (in the absence of an applied magnetic field), returns to its lowest energy state in which the magnetic domain states are randomly distributed. Flux transitions recorded in the layer are generally lost when the layer behaves superparamagnetically.

Attempts to control thermal instability typically attempt to increase the value of the numerator in the above equation, namely $K_u V$. In one approach, a higher anisotropy material is used to provide a higher value for $K_u$ while maintaining the grain volume at a low level to realize desired linear and areal densities. However, the increase in $K_u$ is limited by the point where the coercivity $H_c$, which is approximately equal to $K_u/Ms$ becomes too great to be written by a conventional recording head. As will be appreciated, the "coercivity" of a magnetic material refers to the value of the magnetic field required to reduce the remanence magnetic flux to zero, i.e., the field required to erase a stored bit of information. In the other approach, the effective magnetic volume V of the magnetic grains is increased.

FIG. 2 shows a cross-section of a magnetic disk that provides a low remanence-squareness-thickness-product ("Mrt") while maintaining a high magnetic volume V, thereby providing greater degrees of thermal stability. As will be appreciated, the Mrt is the product of the remanent magnetization Mr, the magnetic moment per unit volume of ferromagnetic material, and the thickness t of the magnetic layer. The disk employs a laminated information layer 200 formed above an underlayer 204 (Cr-alloy), a seed layer 208 (Cr), and supporting substrate 210. In the laminated information layer, the magnetic moments 212 and 216 in the upper (CoCr PtB) and lower ferromagnetic layers 220 and 224, respectively, are antiferromagnetically exchange coupled across a very thin (less than 10 Å thick) nonmagnetic spacer layer 228 (which is typically pure (undoped) ruthenium). The anti-parallel orientations of the moments 212 and 216 add destructively to provide a low net magnetic moment for the laminated magnetic layer 200. The thermal stability of the laminated layer 200 is, theoretically, substantially enhanced because the grains in the lower magnetic layer 224 are magnetically exchange coupled with the grains in the upper magnetic layer 220 and thus the physical volume of layers 220 and 224 add constructively to provide a higher value for V. Thus, the layers can contain very small diameter grains while theoretically maintaining good thermal stability. Anti-ferromagnetically exchange coupled on AFC media are further discussed in U.S. Pat. Nos. 6,602,612 and 6,280,813, each of which is incorporated herein by this reference.

The annular disk shape has complicated the ability to obtain further significant increases in bit density because of the existence of differing operating conditions in different parts of the disk. To obtain higher data rates, the rotation speeds of hard disks are increasing, with speeds of 10,000 to 15,000 rpm now being common. Due to the annular shape of disks, the lengths of the inner tracks (in the inner diameter ("ID") disk region) are significantly less than the lengths of the outer tracks (in the outer diameter ("OD") disk region), and therefore the track velocity in the ID region is less than the track velocity in the OD region. As shown in FIG. 3 for a given rpm and linear density, the recording frequency increases dramatically from the ID to the OD regions.

The disparate track velocities in the ID and OD disk regions together with the substantial uniformity in disk properties across the face of the disk cause the User Bit Density or UBD in the ID and OD regions to be subject to different limiting factors. To obtain adequate bit error rates at high recording frequencies, adequate signal-to-noise ratios have to be achieved. The bit error rates typically correlate to the Spectral Signal-to-Noise Ratio or SpSNR, which is defined as the ratio of the signal amplitude to the total noise at half of the highest recording density. As shown by the following equation, the total noise, $N_t$, is given by the relationship:

$$Nt^2 = Ne^2 + Nm^2$$

where $N_e$ is the electronic noise from the recording head circuit and $N_m$ is the medium noise. The electronic noise $N_e$ increases with the recording frequency f as given by the equation:

$$Ne^2 = (0.9 \, nV^2) \times f/MHZ$$

In FIG. 4, the electronic noise is calculated using the above equation and plotted versus the recording frequency (horizontal axis). As shown in FIG. 4 for a given linear density, $N_e$ (vertical axis) increases from the ID to the OD regions. As shown in FIG. 5, reducing the grain volume by either decreasing the grain diameter or decreasing the remanence-squareness-thickness-product ("Mrt") reduces the media noise. The desired SpSNR value could thus be realized by controlling the actual contributions of the electronic and media noise components in the total noise. As shown in FIG. 6, which considers a rotation of 10,000 rpm and maximum linear bit density of 600 KFCI, the medium noise dominates the total noise in the ID region while the electronic noise dominates the total noise in the OD region. Stated another way, in the ID region the SpSNR improves when a lower Mrt is used while in the OD region the SpSNR improves when a higher Mrt is used.

Increasing the Mrt from the inner diameter to the outer diameter also increases the coercivity from the inner diameter to the out diameter. As will be appreciated, the coercivity of a medium is determined by the process conditions (e.g., substrate temperature and underlayer, seed layer, and intermediate layer structures and the magnetic layer alloy composition). As the conditions are uniformly applied to the disk, the coercivity cannot normally be controlled independent of the Mrt. A higher coercivity of the outer diameter region decreases the overwrite performance. Due to higher linear velocity, the head flies higher at the outer disk diameter and therefore the outer diameter region of the disk has usually lower overwrite performance than the inner diameter region and further increasing the coercivity in the outer diameter region therefore degrades the overall performance. As will be appreciated, overwrite refers to the ability of the recording head to erase the previously written information and write new information.

There is thus a need to provide magnetic media having a lower Mrt in the ID region and a higher Mrt in the OD region while at least substantially minimizing any increase in coercivity at the outer diameter of the media.

SUMMARY OF THE INVENTION

These and other needs are addressed by the various embodiments and configurations of the present invention. The present invention is directed generally to a magnetic disk having differing magnetic properties in the ID and OD regions. By using nonuniform magnetic properties, the ID and OD regions can be configured differently to provide optimum or near optimum disk properties for the differing operating conditions of the two regions.

In one embodiment of the present invention, a magnetic disk for information storage, includes a substrate and an information layer for containing information. The information layer includes an upper magnetic (recording) layer and a lower magnetic layer. The information layer has a remanence-squareness-thickness-product ("Mrt") that varies radially between first and second disk radii. Additionally, one or more of the following conditions is true for the disk:

(i) the information layer has a coercivity that is at least substantially constant between the first and second disk radii (or lower at the disk outer diameter);

(ii) the lower magnetic layer has a magnetic anisotropy energy of no more than about $1.5 \times 10^6 \, erg/cm^3$; and (iii) the magnetic anisotropy energy of the upper magnetic layer is at least about 150% of the magnetic anisotropy energy of the lower magnetic layer.

Many disk variations are possible according to the concepts of the present invention. For example in one configuration, the upper and lower magnetic layers are ferromagnetically exchange coupled. The first disk radius is located closer to the outer periphery of the disk than the second disk radius. In other words, the Mrt radial gradient of both the upper and lower magnetic layers slopes downwardly from the OD region to the ID region of the disk. In another configuration, the upper and lower magnetic layers are antiferromagnetically exchange coupled and the lower magnetic layer acts as a stabilizing layer. The first disk radius is located farther from the outer periphery of the disk than the second disk radius. In other words, the Mrt radial gradients of the upper and lower magnetic layers slopes in opposite directions. The Mrt radial gradient of the upper magnetic layer slopes downwardly from the OD region to the ID region of the disk while the gradient of the lower magnetic layer slopes downwardly from the ID region to the OD region. To cause the Mrt to vary radially, the thickness of the lower magnetic layer (but not the thickness of the upper magnetic layer) is preferably varied radially.

The use of magnetic media having a lower information layer Mrt in the ID region and a higher information layer Mrt in the OD region can provide substantially optimal recording conditions in the two regions. As noted above, the use of a higher Mrt in the OD region and a lower Mrt in the ID region provides improved SpSNR values. This is so because medium noise dominates the total noise in the ID region while electronic noise dominates the total noise in the OD region.

The use of differing information layer Mrt's in the ID and OD regions is offset by the use of a substantially constant coercivity in and between the two regions. The coercivity is controlled by having the coercivity of the upper magnetic layer (which typically has a substantially radially constant Mrt) be dominant. The magnetic anisotropy energy of the lower magnetic layer is preferably no more than about 75% of the magnetic anisotropy energy of the upper magnetic layer to cause this behavior. As will be appreciated, the coercivity of a medium is determined by the process conditions (e.g., substrate temperature and underlayer, seed layer, and intermediate layer structures and the magnetic layer alloy composition). As the conditions are uniformly applied to the disk, the coercivity cannot normally be controlled independent of Mrt.

In this configuration, the disk can include a plurality of radial (concentrically disposed) zones, each of which has substantially uniform recording properties (e.g., coercivity, magnetic remanence, magnetic moment, etc.) throughout the zone's areal (or radial) extent. A first radial zone located between a first pair of radii (measured from a disk center) has a first Mrt substantially throughout the first zone, and a second radial zone located between a second pair of radii (measured from the disk center) has a second different Mrt substantially throughout the second zone. The coercivity in the two zones is substantially the same. The first and second zones are thus disposed concentrically relative to one another.

One or more of the first pair of radii are different (e.g., smaller) than the second pair of radii, and one or more of the first recording properties, are different from the second recording properties. Commonly, a plurality of such concentric zones or bands are located on each surface of the disk. In one configuration, the recording properties vary radially in a stepwise fashion. In another configuration, the recording properties vary radially in a linear or at least substantially linear fashion or a curvilinear or substantially curvilinear fashion (in which cases the radial zones are commonly thinner in width than in the case of stepwise variation).

The magnetic storage media of the present invention can have a number of advantages over prior art magnetic storage media. For example, a better signal-to-noise ratio for high data rate disks can be realized. Due to increasing recording frequency and electronic noise levels from in the ID and OD regions, the variation of Mrt in the two regions can provide better read/write performance in both regions. The use of a low magnetic anisotropy energy in the lower magnetic layer can permit the use of the Mrt gradient without substantially degrading the thermal stability in the ID region and the overwrite performance in the OD region.

These and other advantages will be apparent from the disclosure of the invention(s) contained herein.

The above-described embodiments and configurations are neither complete nor exhaustive. As will be appreciated, other embodiments of the invention are possible utilizing, alone or in combination, one or more of the features set forth above or described in detail below.

DETAILED DESCRIPTION

Figure 1:
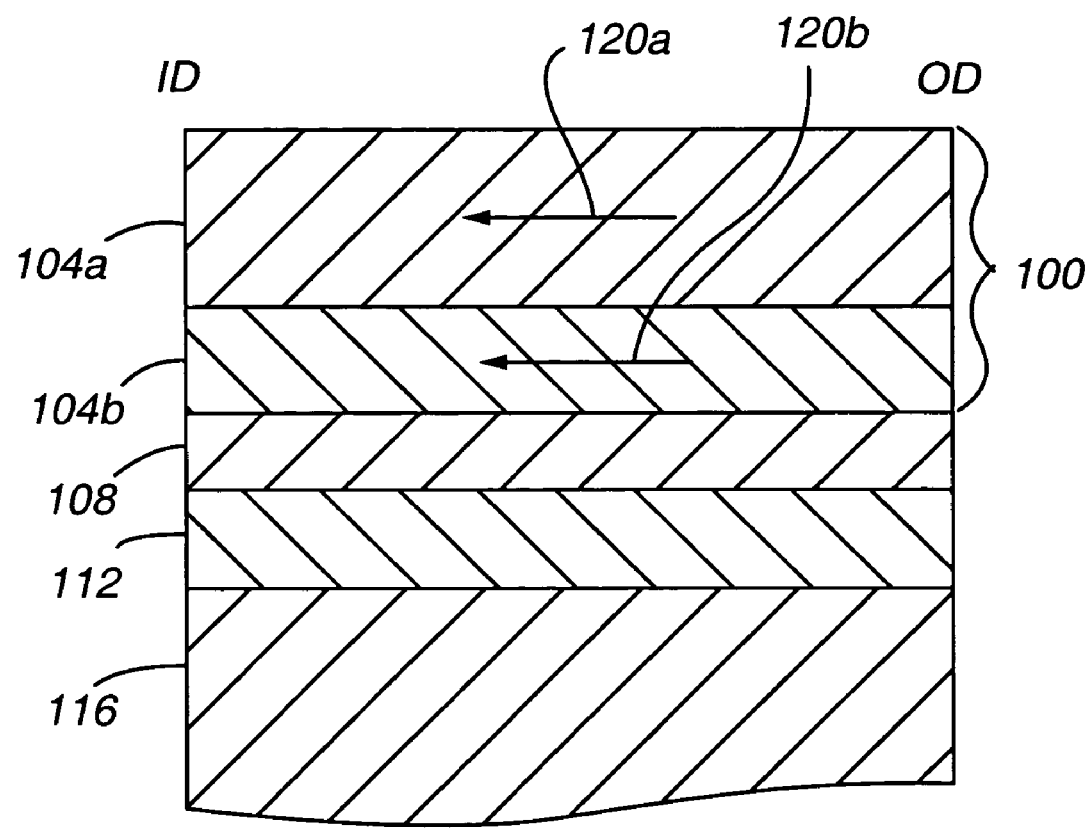
FIG. 1 is a cross-sectional view of a prior art conventional magnetic disk.
Figure 2:
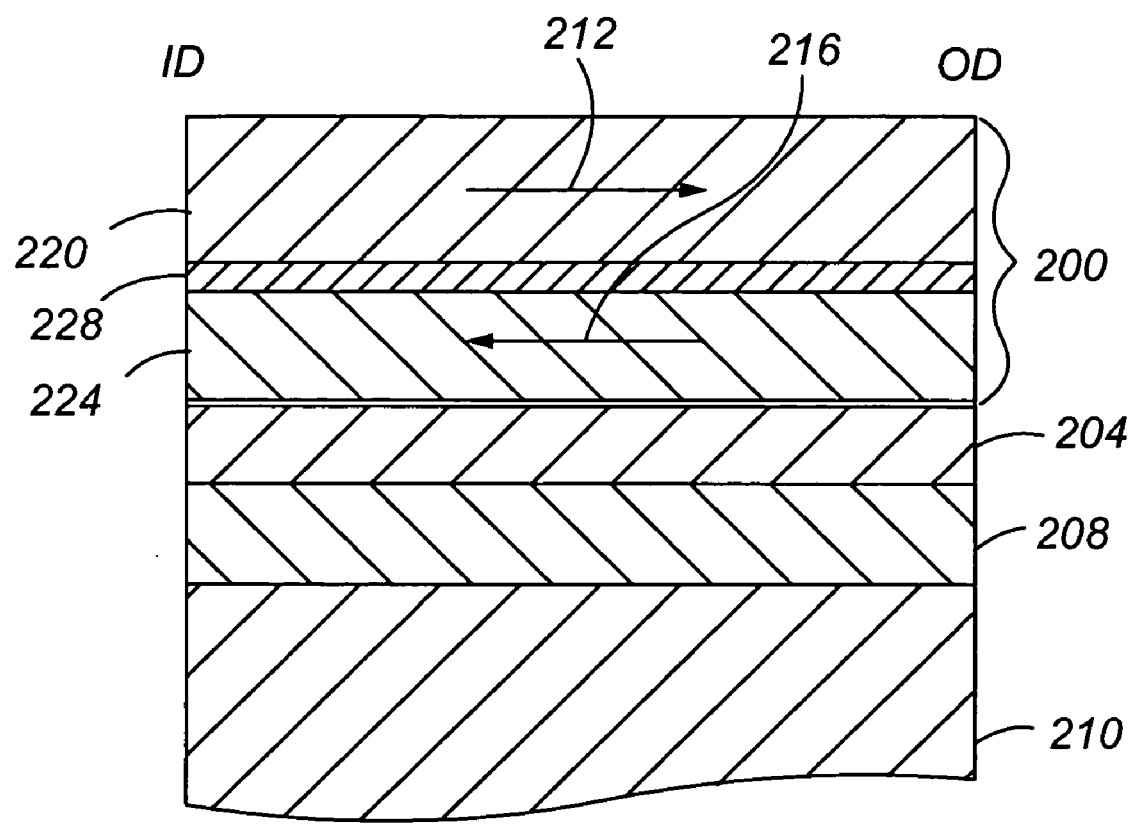
FIG. 2 is a cross-sectional view of a prior art antiferromagnetically exchange coupled magnetic disk.
Figure 3:
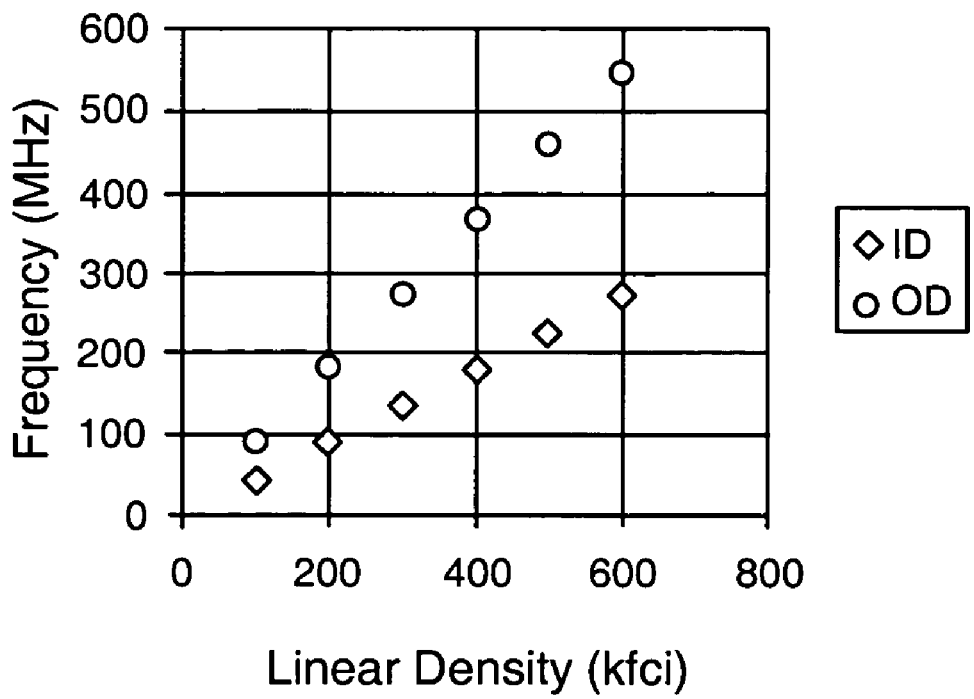
FIG. 3 is a plot of recording frequency (MHZ) (vertical axis) against linear bit density (kfci) (horizontal axis) for the ID region (radius of 22 mm) and OD region (radius of 44 mm) of a 95 mm prior art disk having the configuration of FIG. 1 rotating at 10,000 rpm.
Figure 4:
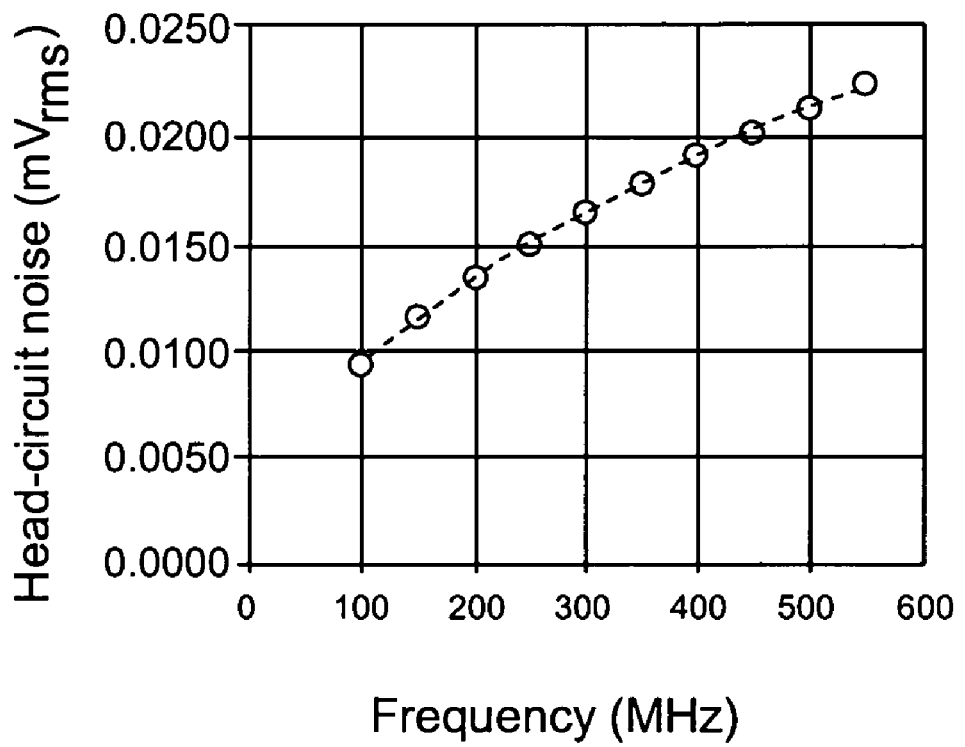
FIG. 4 is a plot of head circuit noise ($mV_{rms}$) (vertical axis) against recording frequency (MHZ) (horizontal axis) for a given linear bit density of a prior art disk having the configuration of FIG. 1.
Figure 5:
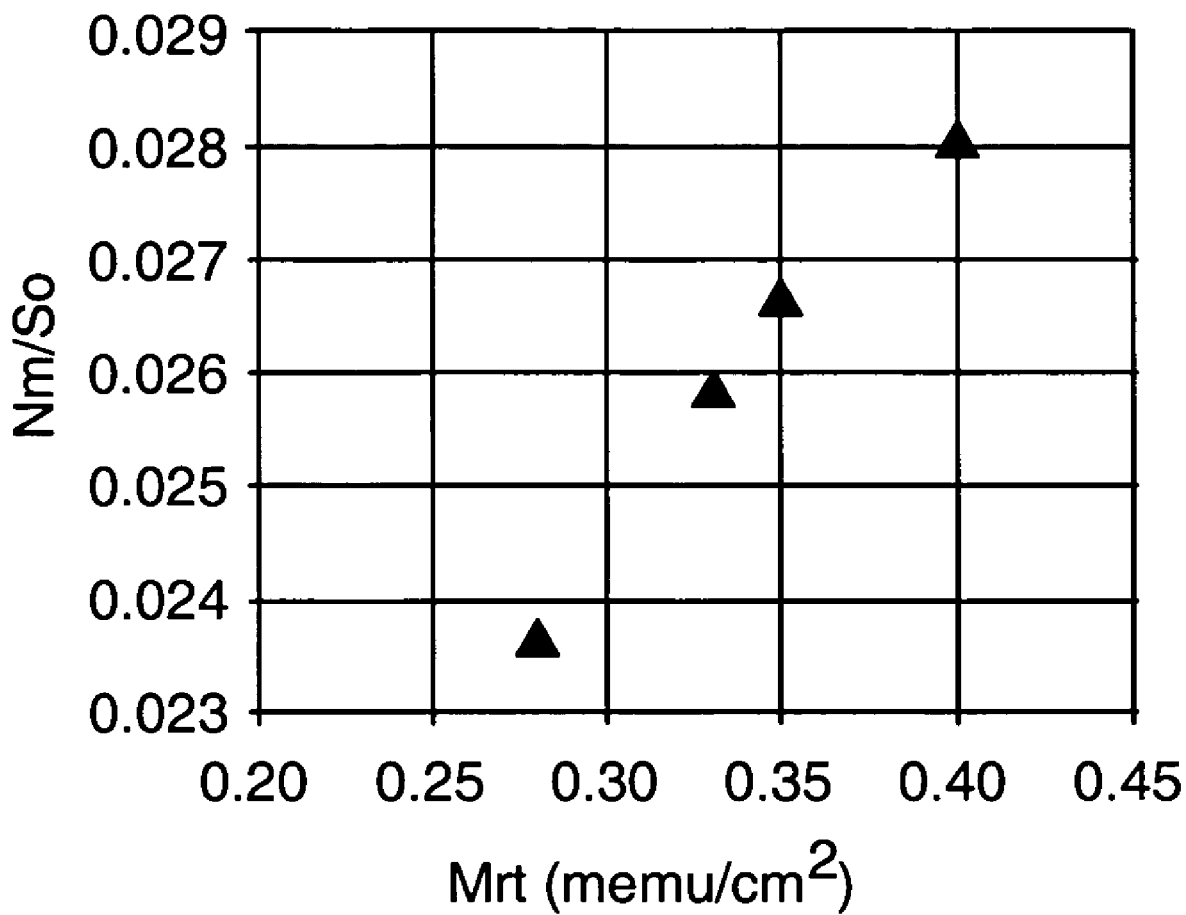
FIG. 5 is a plot of normalized medium noise ($N_m/S_O$) ($mV_{rms}$) (vertical axis) against the remanence-squareness-thickness-product (Mrt) (memu/cm$^2$) (horizontal axis) for a prior art 95 mm disk having the configuration of FIG. 1.
Figure 6:
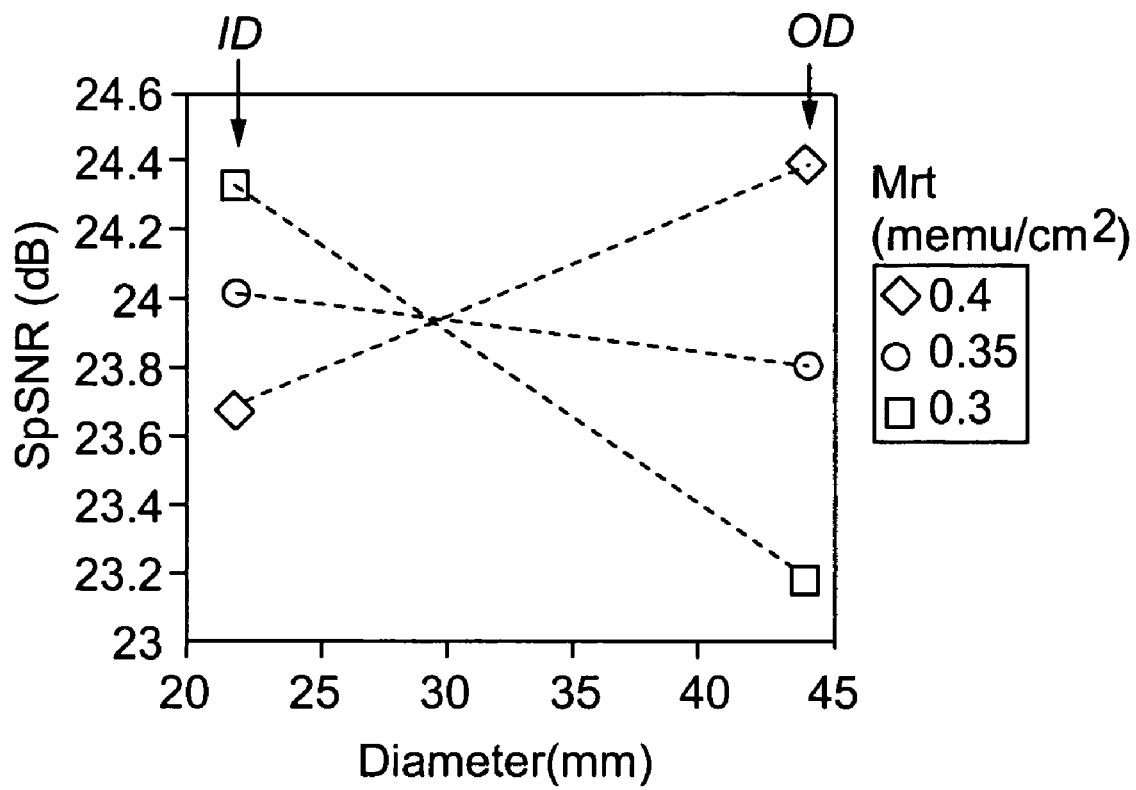
FIG. 6 is a plot of Spectral Signal to Noise Ratio (dB) (vertical axis) against the disk diameter (mm (horizontal axis) for a prior art 95 mm disk having the configuration of FIG. 1.
Figure 7:
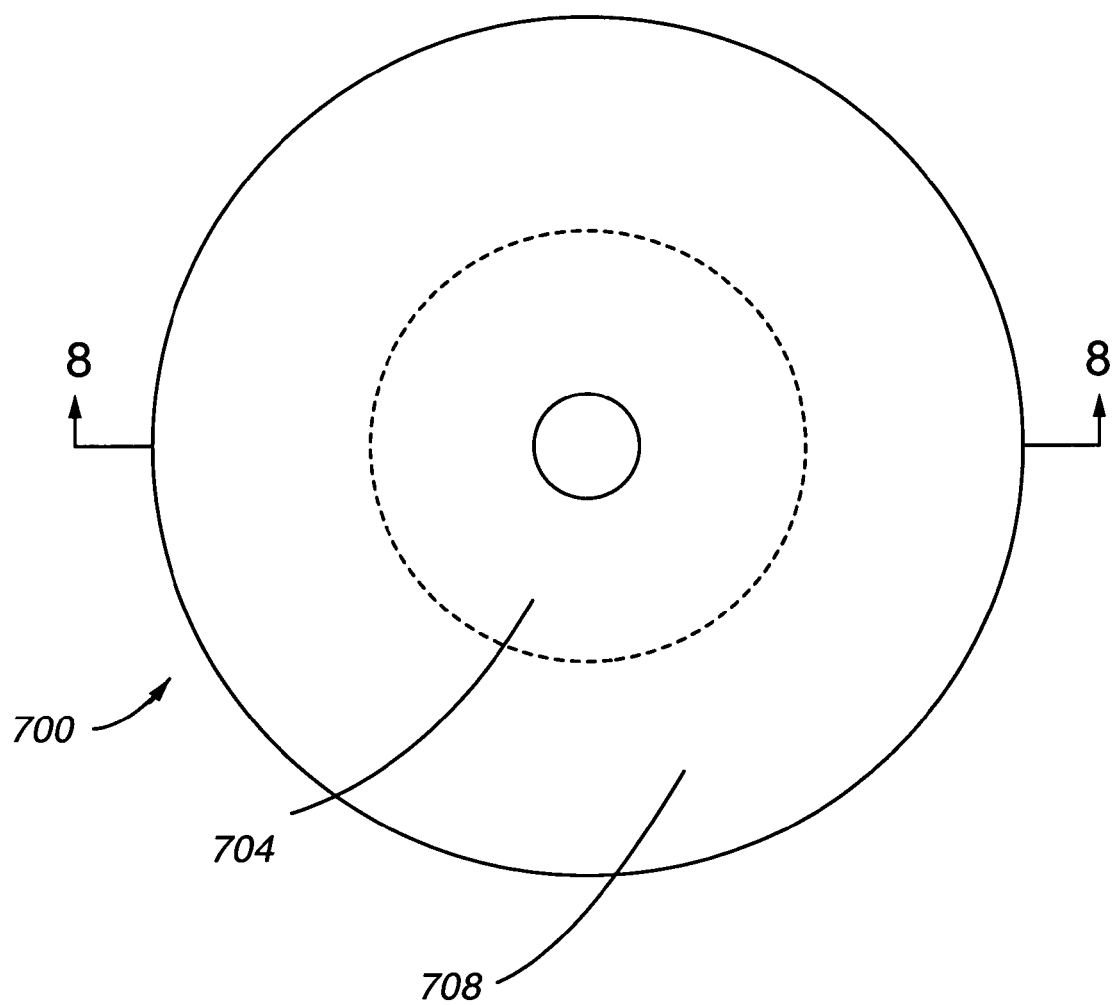
FIG. 7 is a diagrammatic representation of a plan view of a disk according to a first embodiment of the present invention.

A first embodiment of a magnetic disk will be discussed with reference to FIGS. 7 and 8. A magnetic disk 700 includes Inner Diameter (ID) and Outer Diameter (OD) regions 704 and 708, respectively. The disk 700 has various layers, including an information layer 800 including an upper magnetic recording (or information-containing) layer 804 and a lower magnetic layer 808, an underlayer 812, a seed layer 818, and a substrate 822. Although a single-sided disk is depicted in the figures discussed below, the concepts of the present invention are equally applicable to dual-sided disks.

The upper and lower magnetic layers 804 and 808 have magnetic moments 826 and 830, respectively, that are ferromagnetically exchange coupled (or having parallel orientations). The layers 804 and 808 preferably include one or more thin film magnetic layers that employ iron, nickel, or cobalt or alloys of iron, nickel, or cobalt with one or more of samarium, chromium, tantalum, platinum, boron, ruthenium, copper, and silver. In a particularly preferred embodiment, the ferromagnetic material in the upper layer 804 has the formula CoCrPtB and more preferably includes from about 40 to about 79 atomic % cobalt, from about 10 to about 25 atomic % chromium, from about 7 to about 20 atomic % platinum, and from about 4 to about 15 atomic % boron, and the ferromagnetic material in the lower layer 808, though also a cobalt-chromium alloy, has a different chemical composition than the upper layer 804. Preferably, the composition of the lower layer 808 includes from about 69 to about 84 atomic % cobalt, from about 15 to about 25 atomic % chromium and from about 1 to about 6 atomic % tantalum. The upper and lower layers typically each have a thickness ranging from about 20 to about 5,000 Å. As will be appreciated, a substantially or completely non-magnetic layer can be located between the upper and lower magnetic layers to provide a relatively low degree of noise.

The substrate 822 can be any material suitable for the information layer. For example, the substrate can be an aluminum plate, NiP-plated aluminum alloy plate, a ceramic plate, a glass-based plate, a glass-ceramic plate, a carbon plate (e.g., electrically conductive graphite which can provide higher coercivities), a titanium substrate, and plastic substrates.

The underlayer 812 acts as a barrier layer against contamination of other layers by the substrate 104 and providing improved magnetic properties by controlling the magnetic grain sizes. The underlayer 812 can be any material suitable for deposition of the information layer. Preferably, the underlayer is at least substantially nonmagnetic and is formed from chromium, a chromium alloy such as chromium-molybdenum, chromium-molybdenum-boron, chromium-vanadium, or chromium-titanium, oxygen doped chromium, tungsten, or a tungsten alloy, aluminum-based alloys or nickel-phosphorous and alloys thereof. The preferred underlayer thickness ranges from about 20 to about 5,000 Å.

The seed layer 818 can be any material sufficient to induce desired crystal growth in the underlayer and upper and lower magnetic layers. In a preferred embodiment, the seed layer 818 is chromium with a low amount of impurities and has a thickness ranging from about 20 to about 5,000 Å.

The disk can include additional layers, depending on the application. For example, the disk can include one or more protective layers (not shown) positioned over the upper magnetic layer 800 to inhibit corrosion of any underlying material and/or to provide an acceptable surface for landing of the read and/or write head. A preferred protective layer includes carbon or cobalt oxide. The protective layer typically has a thickness ranging from about 150 to about 1,000 Å. The disk can include one or more barrier layers (not shown) located between the upper magnetic layer 804 and the protective layer to inhibit atomic migration to or from the underlying layers. Preferred barrier layers include chromium, a chromium alloy such as chromium-vanadium, or chromium-titanium, oxygen doped chromium, tungsten, or a tungsten alloy, ruthenium or oxidation layers. A barrier layer typically has a thickness ranging from about 100 to about 1,000 Å. The disk can include a lubricant layer (not shown) located adjacent to the protective layer and separated from the upper magnetic layer 804 by the protective layer. The lubricant layer is preferably a perfluoropolymer such as Am2001 manufactured by Montedison Company. The lubricant layer typically has a thickness ranging from about 5 to about 100 Å. Finally, the disk can include a nickel-phosphorus layer (not shown) that is located between the substrate 822 and the seed layer 818. The nickel-phosphorus layer preferably has an ablated or at least substantially smooth top surface and a thickness ranging from about 0.0001 to about 0.001 inches.

Figure 8:
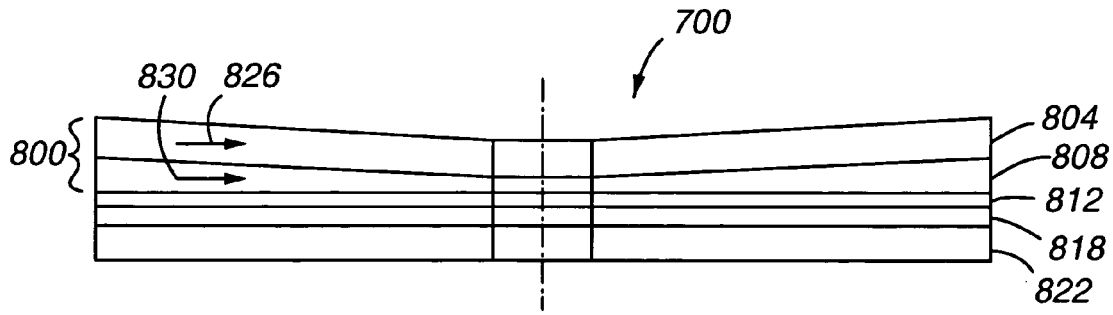
FIG. 8 is a cross-sectional view taken along line 8-8 of FIG. 7.
Figure 10:
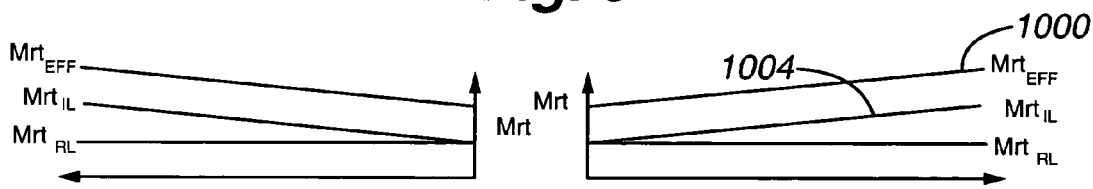
FIG. 10 is a plot of Mrt (memu/cm$^2$) versus radial distance (mm) for the disk of FIG. 8.
Figure 11:
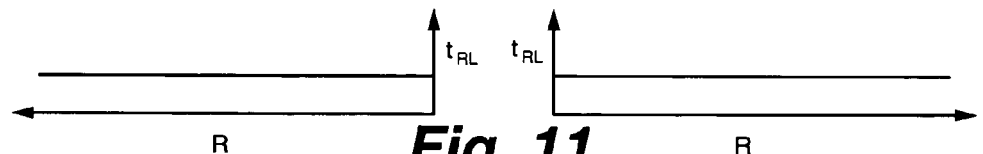
FIG. 11 is a plot of the thickness of the upper magnetic or recording layer ($t_{RL}$) versus radial distance (mm) for the disk of FIG. 8.
Figure 12:
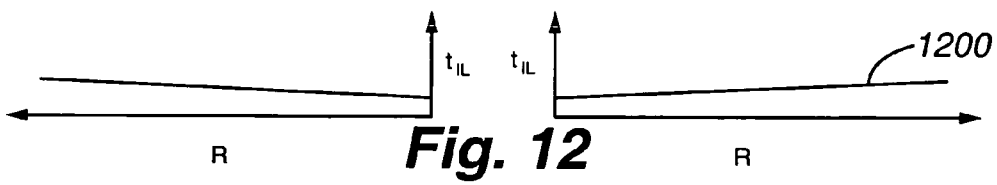
FIG. 12 is a plot of the thickness of the lower magnetic or intermediate layer ($t_{IL}$) versus radial distance (mm) for the disk of FIG. 8.

As shown in FIGS. 8 and 11 though the thicknesses of the substrate 822, seed layer 818, underlayer 812, and upper magnetic layer 804 are at least substantially radially constant (commonly varying from highest to lowest value no more than about 8% and even more commonly no more than about 4%), the thickness of the lower magnetic layer 808 radially varies to provide desired magnetic properties for the information layer 800. As shown in FIG. 12, the lower (or intermediate) magnetic layer thickness $t_{IL}$ (at radial distance $r_i$) is less than the thickness $t_{IL}$ (at outer radial distance $r_o$). Typically, the thickness varies in a continual manner from the innermost to outermost disk radii with the thickness at the innermost disk radius being no more than about 93% and even more typically ranging from about 80 to about 90% of the thickness at the outermost disk radius. As shown in FIG. 10, the variation in lower magnetic layer thickness provides a lower $Mrt_{IL}$ at the inner radius and a higher $Mrt_{IL}$ at the outer radius while the substantially constant thickness of the upper magnetic layer 804 provides a substantially constant $Mrt_{RL}$ (commonly varying from highest to lowest value no more than about 5% and even more commonly varying no more than about 3%). Typically, $Mrt_{IL}$ at the innermost radius is no more than about 93% and even more typically ranges from about 80 to about 90% of $Mrt_{IL}$ at the outermost radius. Because the magnetic moments 826 and 830 are parallel (or ferromagnetically exchange coupled), the effective $Mrt_{EFF}$ for the information layer 800 at any selected radial position is the sum of the $Mrt_{IL}$ and $Mrt_{RL}$. Accordingly, $Mrt_{EFF}$ varies radially such that $Mrt_{EFF}$ is lower at the inner radius and higher at the outer radius. As will be appreciated, the slopes of lines 1000 and 1004 (FIG. 10) and 1200 (FIG. 12) would be steeper for higher spin velocities and shallower for lower spin velocities.

Figure 13:
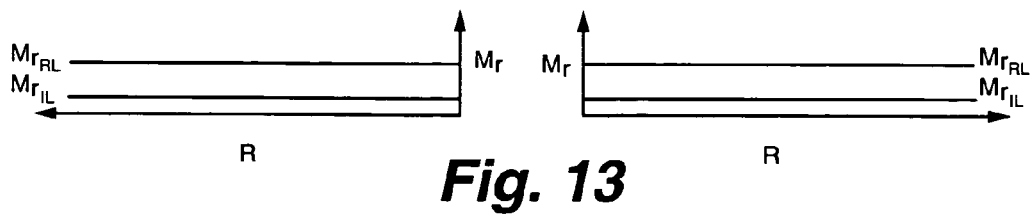
FIG. 13 is a plot of magnetic remanence (Mrt) (memu/cm$^3$) versus radial distance (mm) for the disk of FIG. 2.

As shown in FIG. 13, though it is possible to vary $Mrt_{IL}$ and $Mrt_{EFF}$ by changing the lower magnetic or intermediate layer's magnetic remanence ($Mr_{IL}$) alone or together with the thickness of the intermediate layer, it is preferred that $Mr_{IL}$ remain substantially radially constant (commonly varying from highest to lowest value no more than about 5% and even more commonly varying no more than about 3%). The magnetic remanence typically ranges from about 100 to about 600 memu/cm$^2$. The change in $Mrt_{IL}$ and $Mrt_{EFF}$ is thus preferably effected by changing only the thickness of the intermediate layer 808.

The higher Mrt in the outer diameter region 708 and the lower Mrt in the inner diameter region 704 each provides a higher Spectral Signal-to-Noise Ratio. This is so because medium noise dominates the total noise in the ID region while the electronic noise dominates the total noise in the OD region.

As a result of the variable properties of the disk at the ID and OD regions, the two regions can have differing areal densities. The areal densities (or first user bit density) in the ID and OD regions typically range from about 20 to about 200 Gb/cm². In one configuration, the first areal density in the ID region is at least about 105% and typically ranges from about 100 to about 140% of the second areal density in the OD region.

Figure 9:
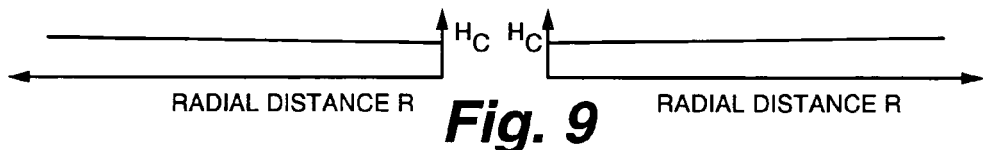
FIG. 9 is a plot of coercivity ($H_C$) (Oe) versus radial distance (mm) for the disk of FIG. 8.

As shown by FIG. 9, the radial change in $Mrt_{IL}$ and $Mrt_{EFF}$ is effected while maintaining a substantially constant coercivity for the information layer 800. As will be appreciated, changes in Mrt are normally directly proportional to changes in coercivity; that is, when Mrt increases coercivity typically increases and when Mrt decreases coercivity typically decreases. This is so because Mrt is normally increased by increasing magnetic grain volume and decreased by decreasing magnetic grain volume. If the coercivity is not controlled, altering the thickness of the lower magnetic layer 808 could cause a coercivity in the information layer 800 at the outermost disk radii (in the OD region) that is too high for effective recording and an information layer coercivity at the innermost disk radii (in the ID region) that is so low that the magnetic recording layer is thermally unstable. Coercivity is controlled by controlling the magnetic anisotropic energy in the lower magnetic layer 808. As will be appreciated, coercivity is determined by the equation, KV, where K is the magnetic anisotropic energy of the magnetic medium and V is the volume of a magnetic grain and also by $K/M_s$, where $M_s$ is the magnetization. Where upper and lower magnetic layers are employed in a magnetic disk, the effective coercivity for the combined layers is provided by the equation, $K_{RL}t_{RL} + K_{IL}t_{IL}/(t_{RL}+t_{IL})$ where $K_{RL}$ is the magnetic anisotropy energy of the recording layer 804, $t_{RL}$ is the thickness of the recording layer 804, $K_{IL}$ is the magnetic anisotropy energy of the lower magnetic layer 808, and $t_{IL}$ is the thickness of the lower magnetic layer 808. To maintain a substantially constant coercivity (which in one configuration varies no more than about 5% from the innermost to outermost radii), $K_{IL}$ is maintained low enough that the contribution of the lower magnetic layer 808 to the effective coercivity is negligible. Or to maintain a lower coercivity at the OD, $K_{IL}$ is maintained low enough that $K_{EFF}$ is lower at the OD than at the ID. Preferably, the magnetic anisotropic energy of the recording layer 804 is preferably at least about 150%, more preferably at least about 200%, and even more preferably ranges from about 200 to about 250% of the magnetic anisotropic energy of the lower magnetic layer 808. In quantative terms, the magnetic anisotropic energy of the recording layer 804 preferably is at least about $1 \times 10^6$ erg/cm³, more preferably at least about $1.8 \times 10^6$ erg/cm³, and even more preferably at least about $2.0 \times 10^6$ erg/cm³ while the magnetic anisotropy energy of the lower magnetic layer 808 preferably is no more than about $1.5 \times 10^6$ erg/cm³, more preferably no more than (and even more preferably less than) about $1 \times 10^6$ erg/cm³, and even more preferably no more than about $0.5 \times 10^6$ erg/cm³. Typically, the coercivity for the information layer ranges from about 2,000 to about 6,000 Oersteds (measured at low frequencies, e.g., 100 Hz), and the disk 700 has a squareness S* ranging from about 0.6 to about 1.0 and varies from highest to lowest value no more than about 10%, more typically no more than about 5%, and even more typically no more than about 3% from the inner to the outer disc radii.

A second embodiment of a magnetic disk will now be discussed with reference to FIGS. 7 and 14-19. The magnetic disk 700 comprises the information layer 1400, including the upper (recording) magnetic layer 1404 (which can include stacked laminated first and second magnetic layers) and the lower (stabilizing) magnetic layer 1408, a nonmagnetic spacer layer 1412 between the upper and lower magnetic layers 1404 and 1408, the underlayer 812, and the seed layer 818. As can be seen from the magnetic moments 1412 and 1416 in the upper and lower magnetic layers 1404 and 1408, nonmagnetic spacer layer 1412 causes the magnetic moments to be anti-ferromagnetically exchange coupled. As discussed in copending U.S. application Ser. No. 10/227,019, filed Aug. 23, 2002, entitled "Intermediate Layer for Antiferromagnetically Exchange Coupled Media" (which is incorporated herein by this reference) the nonmagnetic spacer layer 1412 can be pure (undoped) ruthenium and is typically less than 10 Å thick.

In anti-ferromagnetically exchange coupled media, the magnetic moments 1412 and 1416 are anti-parallel. The anti-parallel orientations of the moments 1412 and 1416 add destructively to provide a low net magnetic moment for the laminated magnetic layer 1400. The effective $Mrt_{EFF}$ for the information layer 1400 is thus the difference between the Mrt values for the upper and lower magnetic layers 1404 and 1408. As in the case of ferromagnetically exchange coupled media, the thermal stability of the laminated information layer 1400 can be substantially enhanced because the grains in the lower magnetic layer 1408 are magnetically coupled with the grains in the upper magnetic layer 1404 and thus the physical volume of layers 1404 and 1408 add constructively to provide a higher value for V.

Figure 14:
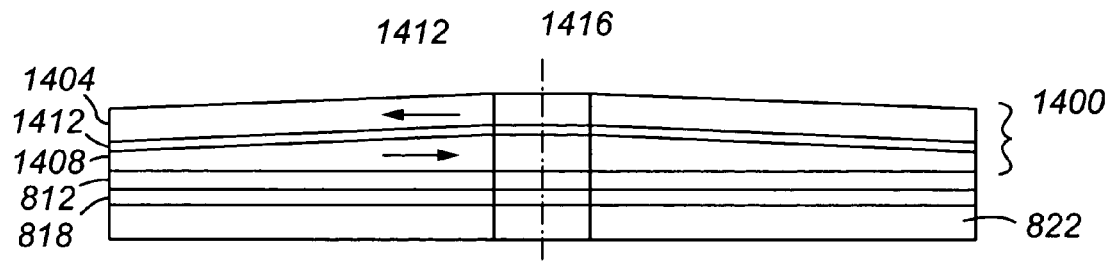
FIG. 14 is a cross-sectional view taken along line 8-8 of FIG. 7 of a disk according to a second embodiment of the present invention.
Figure 15:
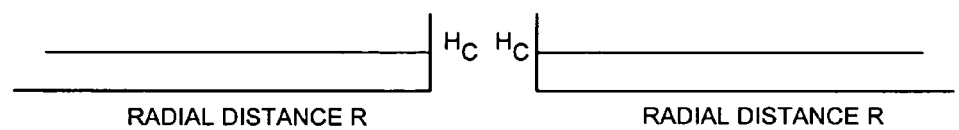
FIG. 15 is a plot of coercivity ($H_C$) (Oer) versus radial distance (mm) for the disk of FIG. 14.
Figure 16:
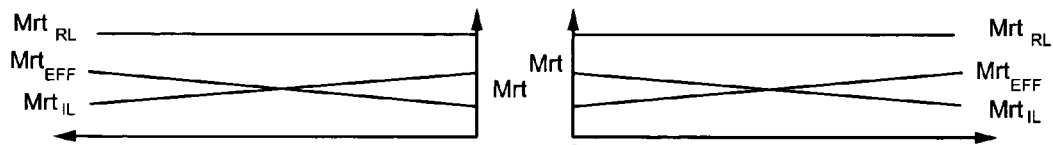
FIG. 16 is a plot of Mrt (memu/cm$^2$) versus radial distance (mm) for the disk of FIG. 14.
Figure 17:
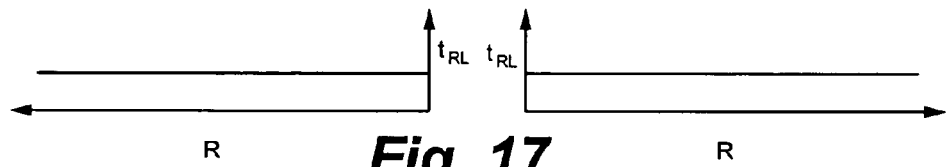
FIG. 17 is a plot of the thickness of the recording layer ($t_{IL}$) versus radial distance (mm) for the disk of FIG. 14.
Figure 18:
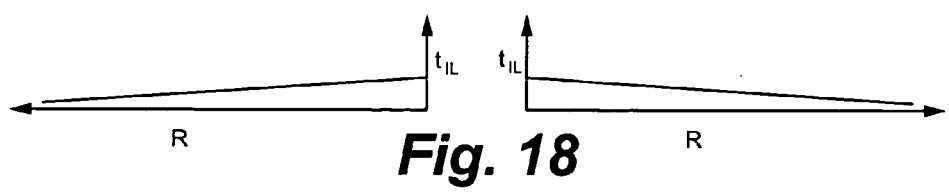
FIG. 18 is a plot of the thickness of the intermediate layer ($t_{IL}$) versus radial distance (mm) for the disk of FIG. 14.
Figure 19:
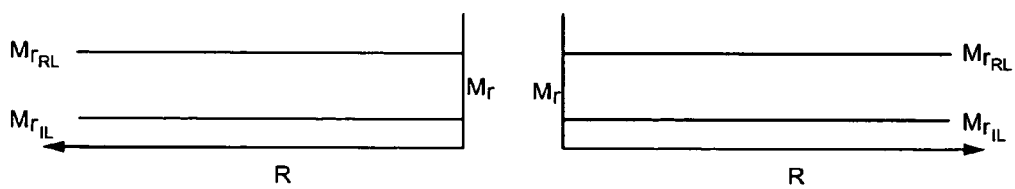
FIG. 19 is a plot of magnetic remanence (Mr) (memu/cm$^3$) versus radial distance (mm) for the disk of FIG. 14.

As can be seen from FIGS. 14 and 16 to realize the desired gradient in $Mrt_{EFF}$ shown in FIGS. 10 and 16, the gradient in $Mrt_{IL}$ for the AFC disk of FIG. 14 (FIG. 16) is directly opposite the gradient in $Mrt_{IL}$ for the non-AFC disk of FIG. 8 (FIG. 10). This is so because $Mrt_{EFF}$ for information layer 800 of the non-AFC disk is the sum of $Mrt_{IL}$ and $Mrt_{RL}$ while $Mrt_{EFF}$ for the AFC disk is the difference between $Mrt_{IL}$ and $Mrt_{RL}$. This gradient is produced by having a gradient in the thickness of the intermediate layer in the AFC disk (FIG. 18) that is the opposite of the gradient in the thickness of the intermediate layer in the non-AFC disk of FIG. 8 (FIG. 12). Typically, $Mrt_{IL}$ at the innermost radius is at least about 110% and even more typically ranges from about 115 to about 125% of $Mrt_{IL}$ at the outermost radius. Preferably, the thickness $t_{IL}$ of the intermediate layer 1408 at the innermost radius is at least about 110% and even more preferably ranges from about 115 to about 125% of the thickness $t_{IL}$ of the intermediate layer at the outermost radius. As can be seen from FIGS. 15, 17, and 19, the coercivity, recording layer thickness, and recording and intermediate layer magnetic remanences remain at least substantially constant from the innermost to the outermost radii. Mrt at the innermost radius typically ranges from about 0.3 to about 0.5 memu/cm³.

Figure 20:
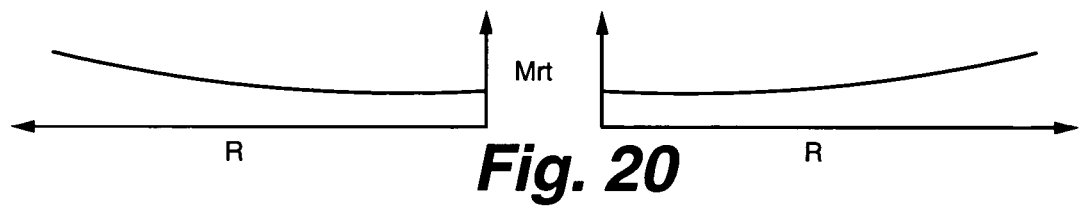
FIG. 20 is a plot of Mrt (memu/cm$^2$) versus radial distance (mm) for a ferromagnetically exchange coupled disk of a third embodiment.
Figure 21:
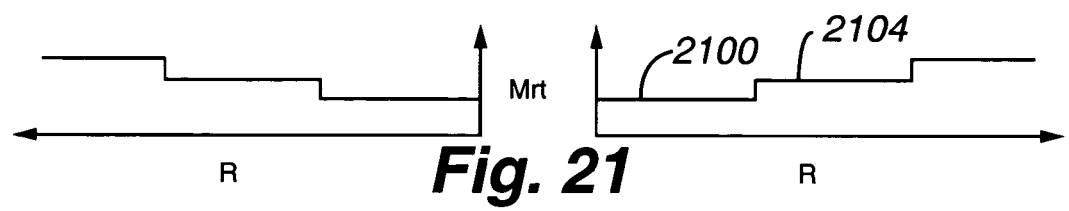
FIG. 21 is a plot of Mrt (memu/cm$^2$) versus radial distance (mm) for a ferromagnetically exchange coupled disk of a fourth embodiment.
Figure 22:
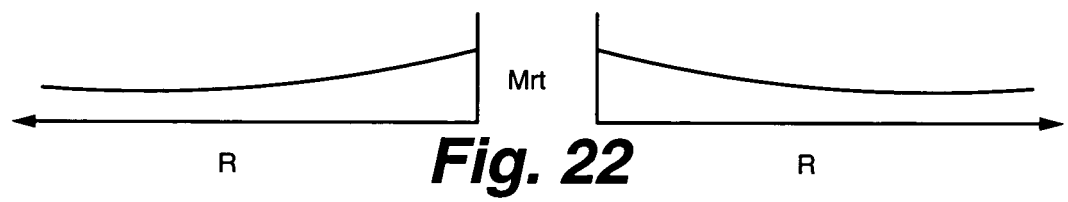
FIG. 22 is a plot of Mrt (memu/cm$^2$) versus radial distance (mm) for an anti-ferromagnetically exchange coupled disk of a fifth embodiment.
Figure 23:
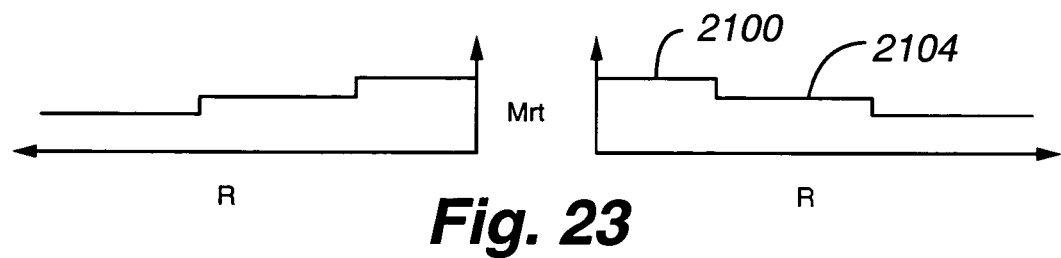
FIG. 23 is a plot of Mrt (memu/cm$^2$) versus radial distance (mm) for an anti-ferromagnetically exchange coupled disk of a sixth embodiment.

Although a linear relationship is depicted in FIGS. 10 and 16, other relationships can be employed for $Mrt_{EFF}$, such as curvilinear (FIG. 20 for ferromagnetically exchanged coupled (or AFC) media and FIG. 22 for ferromagnetically exchanged coupled (or non-AFC) media), rectilinear (FIG. 21 for ferromagnetically exchanged coupled media and FIG. 23 for ferromagnetically exchanged coupled media), etc., relationships depending on the application. In the rectilinear relationships of FIGS. 21 and 23, the disk has a plurality of concentrically disposed radial zones, of which first and second zones 2100 and 2104 are depicted. The first and second radial zones 2100 and 2104 each have an at least substantially constant Mr, t, and $H_c$. The intermediate layer thickness and Mrt values, however, are each different for the two zones.

Figure 24:
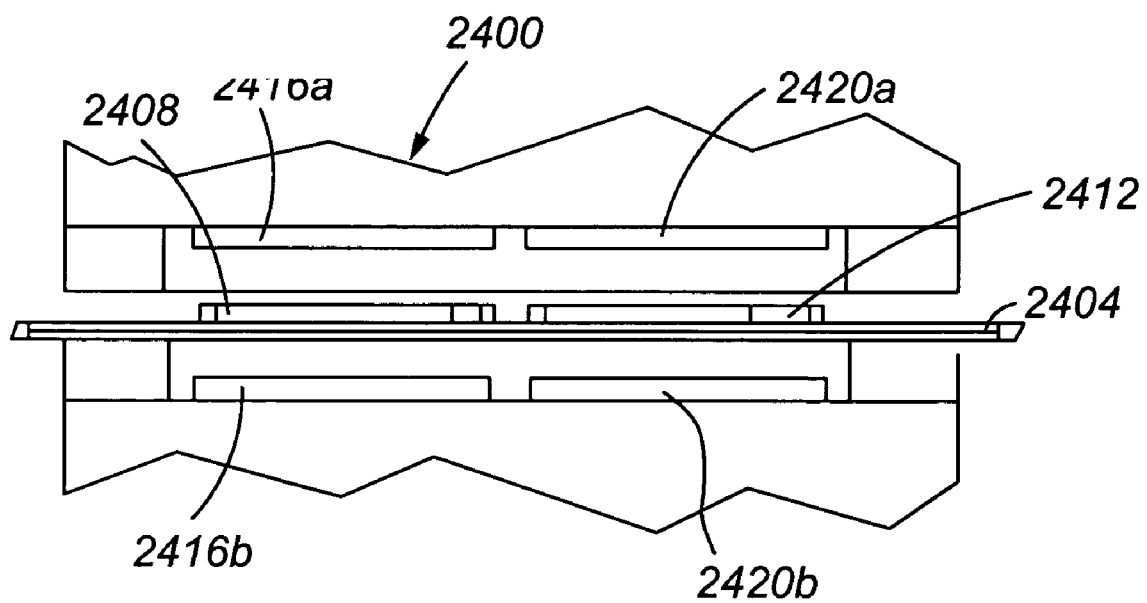
FIG. 24 is a diagrammatic representation of a cross-sectional view of a sputtering station in a sputtering apparatus used in producing the thin-film medium of the present invention.

FIG. 24 depicts a sputtering system 2400 which can be used for producing the disk embodiments described above. The system includes a vacuum chamber having at least four stations at which sputtering or heating operations are conducted. A heating station (not shown) at the upstream end of the chamber has a plurality of infrared lights or resistive heaters arrayed for heating both sides of the substrate which is carried through the station in the chamber on a disc holder 2404 or pallet. Two substrates 2408 and 2412 are carried side-by-side on the disc holder 2404 for transport through the system on a conveyor.

Downstream of the heating station are a plurality of such sputtering stations, the number of which depends on the number of sputtered layers to be deposited. In the disk embodiment of FIG. 8, at least four stations would be used to sputter (i) the seed layer 818, (ii) the underlayer 812, (iii) the lower magnetic layer 808,1408, and (iv) the upper magnetic layer 804, 1404.

FIG. 24 is an illustrative station used for sputtering layers of constant and varying thicknesses. For each substrate 2408 and 2412, the station includes two circular or rectangular targets 2416a,b and 2420a,b, respectively, each of which can sputter a selected metal or metal alloy onto the substrate. Sputtering is described in detail in U.S. Pat. Nos. 5,723,032; 5,707,706; 5,520,981; 5,432,012; 5,324,593; 5,149,409; 4,929,514; and 4,610,911, each of which is incorporated herein by reference.

Figure 25:
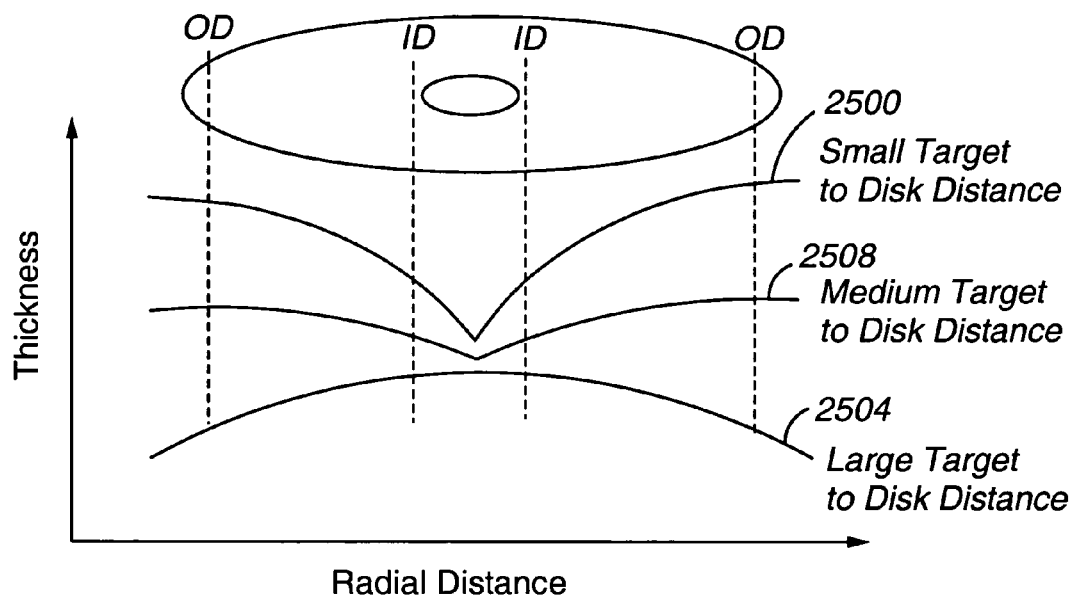
FIG. 25 is a plot of the thickness of a deposited layer (vertical axis) versus radial distance (mm) (horizontal axis) using the sputtering station of FIG. 24.

FIG. 25 depicts how layers of constant or varying thicknesses are sputtered. The key parameter is the target-to-disk distance ($D_{TD}$) (FIG. 24). When $D_{TD}$ is small (no more than about 18 mm), a thickness gradient 2500 is produced that is similar to that for the intermediate layer 808 thickness of FIG. 12. When $D_{TD}$ is large (more than about 22 to 26 mm), a thickness gradient 2504 is produced that is similar to that for the intermediate layer 1408 thickness of FIG. 18. When $D_{TD}$ is medium (from about 18 to about 22 mm), a flatter thickness gradient 2508 is produced that, depending on the degree of flatness, can be used for the any of the thickness gradients of FIGS. 11-12 and 17-18.

In operation, the sputtering chamber is evacuated to a pressure of about $10^{-7}$ Torr, and argon gas is introduced into the chamber to a final sputtering pressure of 5 to 40 mTorr. The substrate(s) is heated in the heating station to a selected temperature (e.g., typically from about 50 to about 400° C.) before advancing into the four sputtering chambers of the appropriate configuration. The heating conditions in the system are preferably adjusted to achieve a substrate temperature of between about 200° C., and preferably about 300° C. Ceramic and glass substrates can be heated up to about 380° C.

The deposition conditions for the seed layer 818 typically are a sputter pressure ranging from about 3 to about 100 mTorr; for the underlayer 812 typically are a sputter pressure ranging from about 3 to about 100 mTorr; and for the upper and lower magnetic layers 804, 1404 and 808, 1408 a sputter pressure ranging from about 3 to about 100 mTorr.

The substrate(s) are moved consecutively from station to station until the desired layers are deposited in the desired thicknesses.

EXPERIMENTAL

Figure 26A:
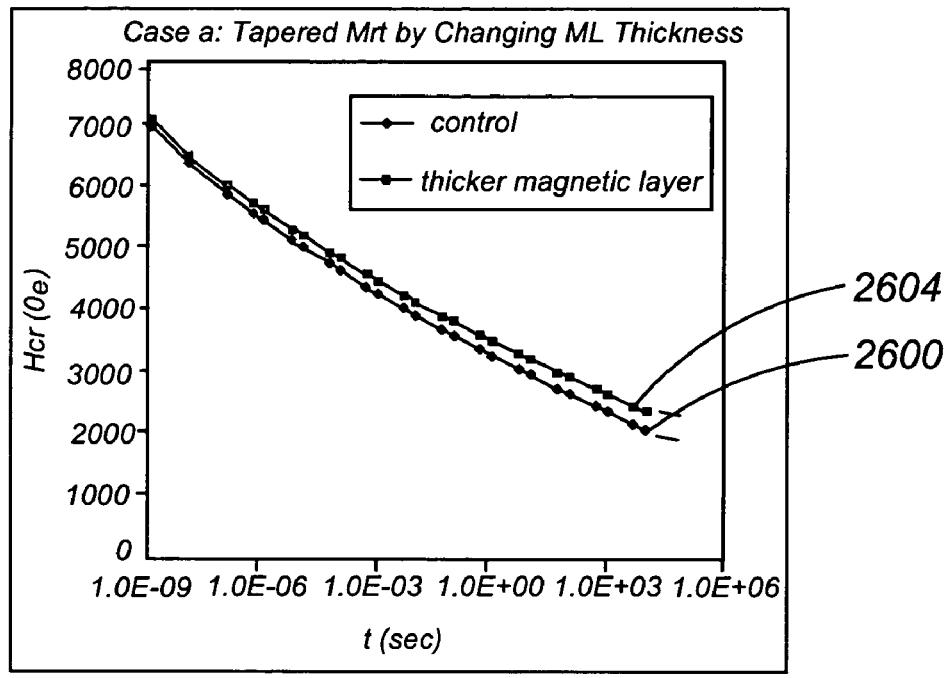
FIG. 26A is a plot of coercivity ($H_C$) (Oer) (vertical axis) versus the measurement time (sec) (horizontal axis) of a recording pulse applied to the recording layer for a disk having a radially varied recording layer thickness.

FIGS. 26A and B depict theoretical calculations for selected AFC magnetic recording media, such as that in FIG. 14. The parameters used in the theoretical calculations are shown in the following table:

As will be appreciated, with reference to FIG. 14 t(IL) refers to the thickness of the stabilization layer 1408, K(IL) to the magnetic anisotropy of the stabilization layer 1408, t(M1) to the thickness of a lower portion of the recording layer 1404, K(M1) to the magnetic anisotropy of the lower portion of the recording layer 1404, t(M2) to the thickness of the upper portion of the recording layer 1404, K(M1) to the magnetic anisotropy of the upper portion of the recording layer 1404, Keff to the effective magnetic anisotropy for all of the stabilization layer and upper and lower portions of the magnetic layers, Ms(IL) to the magnetic remanence of the stabilization layer 1408, Ms1 to the magnetic remanence of the lower portion of the recording layer 1404, Ms2 to the magnetic remanence of the upper portion of recording layer 1404, Mrt to the remanence-squareness-thickness product for the various magnetic layers, and V* to the magnetic grain volume.

FIG. 26A shows the relationship between coercivity and switching time for tapered magnetic media. The control curve 2600 represents the coercivity for magnetic media having a shallower radial Mrt gradient than the Mrt gradient in the magnetic represented by curve 2604. Stated another way, the Mrt value at a given location in the outer diameter region for the magnetic media corresponding to the control curve 2600 is higher (by 0.03 memu/cm$^2$) than at the same location in the magnetic media corresponding to the curve 2604. This is so because the thickness of the magnetic layer (the upper magnetic layer 1404 in FIG. 14) is greater in the media represented by curve 2604 than in the media represented by the control curve 2600. As can be seen from the Figure, the coercivity is higher for the media represented by curve 2604 when compared to the coercivity for the media represented by the curve 2600.

Figure 26B:
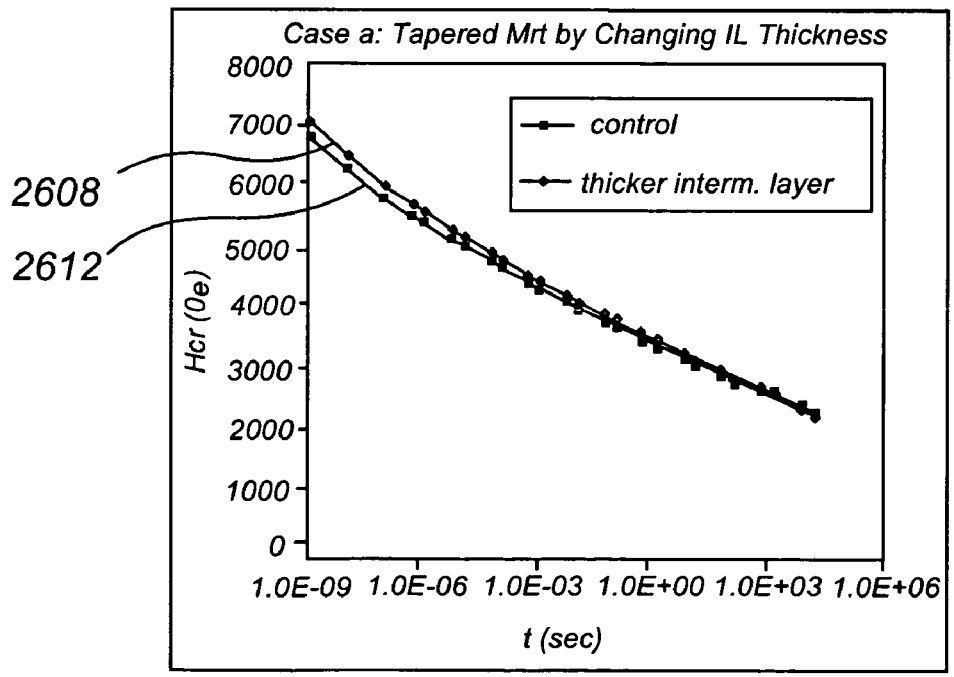
FIG. 26B is a plot of coercivity ($H_C$) (Oer) (vertical axis) versus the measurement time (sec) (horizontal axis) of a recording pulse applied to the recording layer for the disk of FIG. 8 having a radially varied intermediate layer thickness.

FIG. 26B also shows the relationship between coercivity and time for tapered magnetic media. The control curve 2608 represents the coercivity for magnetic media having a shallower radial Mrt gradient than the Mrt gradient in the magnetic represented by curve 2612. Stated another way, the Mrt value at a given location in the outer diameter region for the magnetic media corresponding to the control curve 2608 is higher (by 0.03 memu/cm$^2$) than at the same location in the magnetic media corresponding to the curve 2612. This is so because the thickness of the intermediate magnetic layer (the lower magnetic layer 1408 in FIG. 14) is greater in the media represented by curve 2612 than in the media represented by the control curve 2608. As can be seen from the Figure, the coercivity is lower for the media represented by curve 2612 when compared to the coercivity for the media represented by the curve 2608.

These two curves illustrate that, by increasing the thickness of the intermediate layer rather than the recording layer, a given increase in Mrt can be realized while lowering the coercivity. Realizing the same increase in Mrt by increasing

|  | t(IL) nm | K(IL) erg/cm$^3$ | t(M1) nm | K(M1) erg/cm$^3$ | t(M2) nm | K(M2) erg/cm$^3$ | Keff erg/cm$^3$ | Ms(IL) emu/cm$^3$ | Ms1 emu/cm$^3$ | Ms2 emu/cm$^3$ | Mrt memu/cm$^2$ | V* cm$^3$ |
|---|---|---|---|---|---|---|---|---|---|---|---|---|
| Control | 2 | 5.00E+05 | 8 | 1.70E+06 | 7 | 2.90E+06 | 2.05E+06 | 150 | 160 | 390 | 0.366 | 1.02 E-18 |
| Thicker IL | 4 | 5.00E+05 | 8 | 1.70E+06 | 7 | 2.90E+06 | 1.89E+06 | 150 | 160 | 390 | 0.392 | 1.15 E-18 |
| Thicker recording layer | 2 | 5.00E+05 | 8.6 | 1.70E+06 | 7.525 | 2.90E+06 | 2.07E+06 | 150 | 160 | 390 | 0.392 | 1.09 E-18 | the recording layer thickness can lead to an unacceptable increase in the coercivity for high frequency writing in the nanosecond range.

Figure 27A:
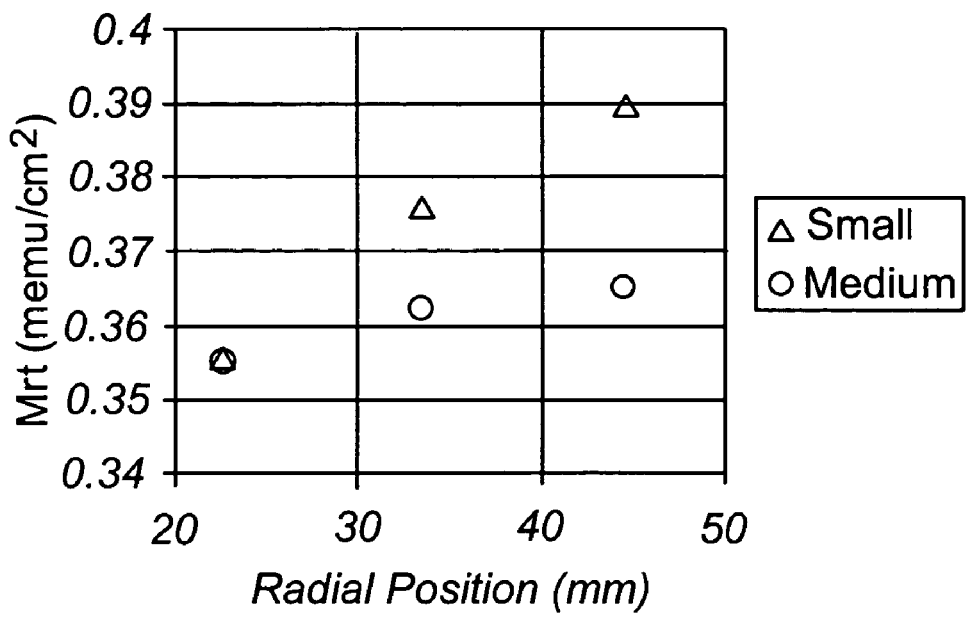
FIG. 27A is a plot of Mrt (memu/cm$^2$) (vertical axis) versus radial position (mm) (horizontal axis) for the disk of FIG. 8, wherein "small" refers to a target-to-disk distance in the station of FIG. 24 that is low in magnitude while "medium" refers to a target-to-disk distance in the station of FIG. 24 that is medium in magnitude.
Figure 27B:
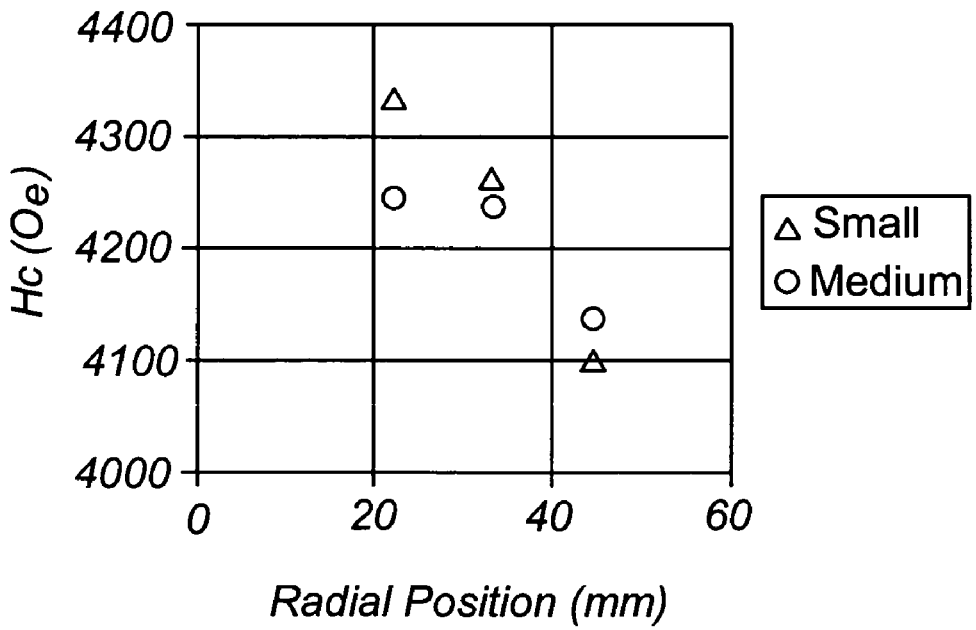
FIG. 27B is a plot of coercivity ($H_C$) (Oer) (vertical axis) versus radial position (mm) (horizontal axis) for the disk of FIG. 8, wherein "small" refers to a target-to-disk distance in the station of FIG. 24 that is low in magnitude while "medium" refers to a target-to-disk distance in the station of FIG. 24 that is medium in magnitude.

FIGS. 27A and B depict Mrt versus radial position for the magnetic media depicted in FIG. 8. FIG. 27A plots Mrt (vertical axis) against radial position (horizontal axis), and FIG. 27B coercivity (vertical axis) against radial position (horizontal axis). The Figures illustrate that, though Mrt is increased in the outer diameter region, the coercivity is decreased in the same region.

Figure 28:
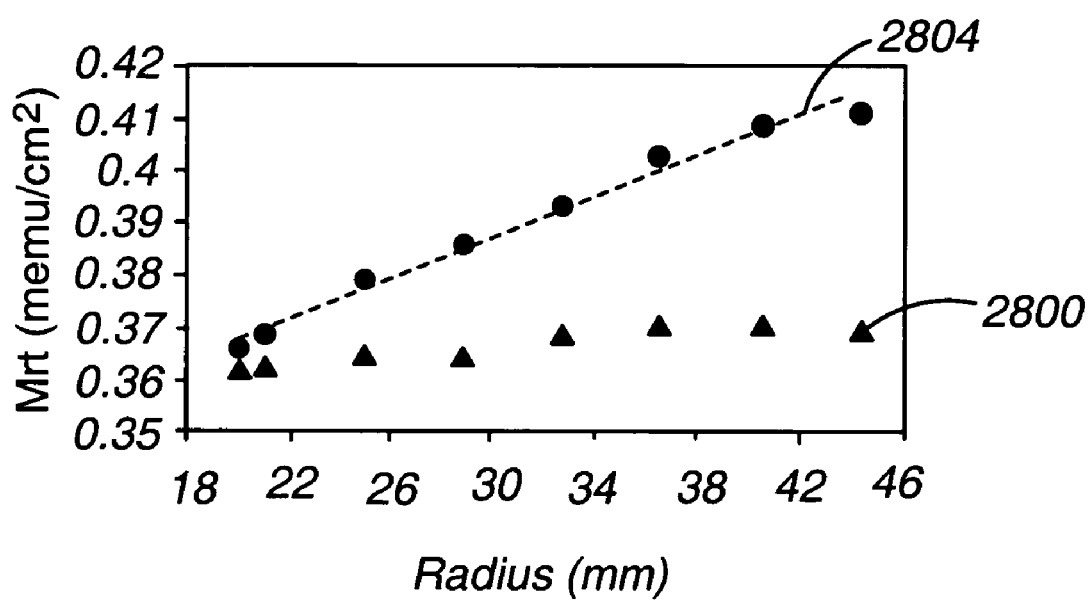
FIG. 28 is a plot of Mrt (memu/cm$^2$) (vertical axis) versus radius (mm) (horizontal axis) for magnetic media of the prior art and the present invention.

FIG. 28 shows that Mrt (vertical axis) profiles versus radius (horizontal axis) for non-AFC magnetic media according to the prior art (curve 2800) and according to the magnetic media of FIG. 8 (curve 2804). Curve 2804 shows Mrt to increase from the inner diameter region to the outer diameter region while curve 2800 shows Mrt to be substantially constant for non-AFC media according to the prior art.

Figure 29:
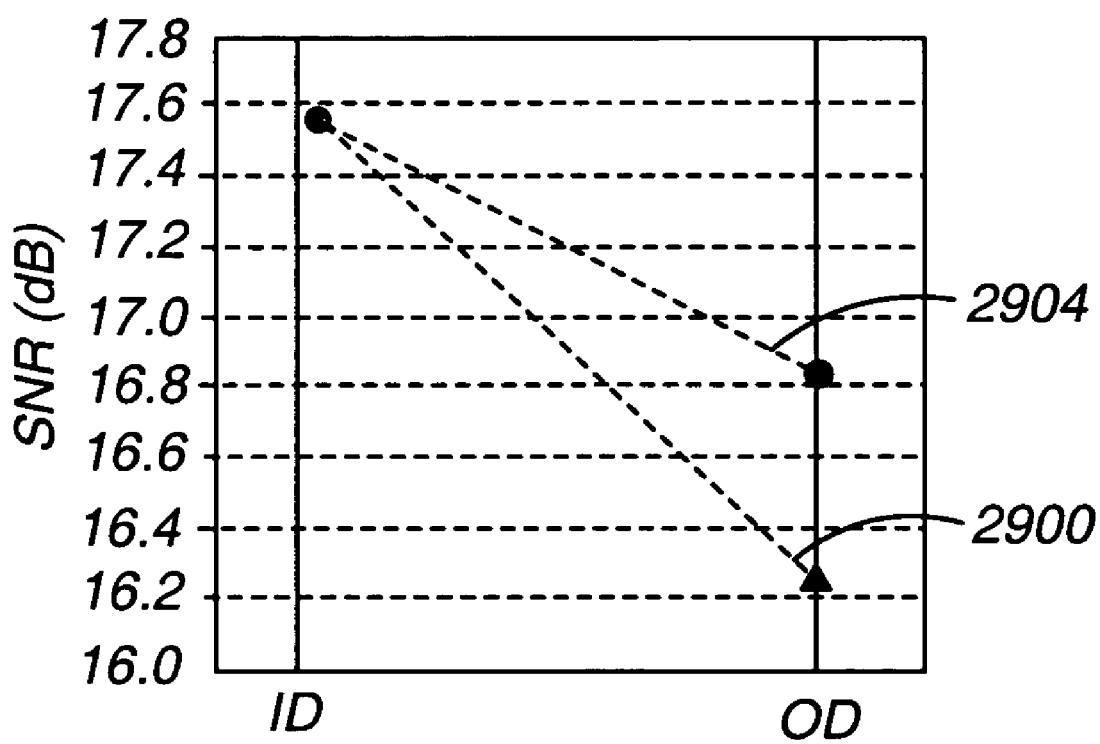
FIG. 29 is a plot of signal-to-noise-ratio (dB) (vertical axis) versus radial position (mm) (horizontal axis) for magnetic media according to the prior art and the present invention.

FIG. 29 shows the Signal-to-Noise Ratio (SNR) of non-AFC magnetic media according to the prior art (curve 2900) and according to the magnetic media of FIG. 8 (curve 2904). Mrt in the inner diameter region is maintained constant (0.36 memu/cm$^2$) for both cases. On the other hand, the media with tapered Mrt (curve 2904) shows higher SNR in the outer diameter region due to a higher Mrt.

The table below shows further examples of media with a flat Mrt profile (according to the prior art) and tapered Mrt profile media (according to the present invention). A flat inner diameter region to outer diameter region coercivity profile is obtained with flat Mrt profile media whereas the coercivity has been decreased in the outer diameter for tapered Mrt profile media. Overwrite or OW values measured in the outer diameter region are also presented below. In the case of a flat Mrt profile media, the overwrite decreases with increasing Mrt whereas the overwrite does not degrade for tapered Mrt profile media. A larger Mrt usually degrades Mrt, while a lower coercivity increases the overwrite. By designing a tapered coercivity along with the tapered Mrt, the media of the present invention can provide improved media performance in terms of both SNR and OW.

|  | Mrt | | Hc | | |
| --- | --- | --- | --- | --- | --- |
|  | ID | OD | ID | OD | OW at OD |
| Flat Mrt Profile media | 0.34 | 0.34 | 4030 | 4050 | 33.9 |
|  | 0.36 | 0.36 | 4030 | 4060 | 33.7 |
|  | 0.39 | 0.39 | 4130 | 4170 | 33.1 |
| Tapered Mrt Profile media | 0.33 | 0.36 | 4090 | 4020 | 34.5 |
|  | 0.33 | 0.38 | 4160 | 4061 | 34.6 |
|  | 0.33 | 0.37 | 4250 | 4193 | 34.4 |

A number of variations and modifications of the invention can be used. It would be possible to provide for some features of the invention without providing others.

For example in one alternative embodiment, the chemical composition of the lower magnetic layer can be radially varied in a continuous or stepwise (discontinuous) fashion to vary the magnetic remanence. As will be appreciated, the magnetic remanence is determined not only by magnetic layer thickness but also by chemical composition. In this embodiment, the chemical composition of the magnetic layers are at least substantially constant at a given radial position but different at different radial positions. For example, the magnetization layer can be cobalt-based and have levels or contents of platinum and/or nickel that increase radially from the ID to the OD regions.

In other embodiments, the magnetic medium can include additional magnetic layers, which may or may not be separated by interlayers or spacing layers.

The present invention may be used for disks effecting information storage in more than one magnetic layer.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g. for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover though the description of the invention has included description of one or more embodiments and certain variations and modifications, other variations and modifications are within the scope of the invention, e.g. as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

We claim:

1. A magnetic disk for information storage, comprising:
   (a) a substrate;
   (b) an information layer for containing information, the information layer comprising an upper and a lower magnetic layer, wherein the information layer has a remanence squareness-thickness-product ("Mrt") that varies radially between first and second disk radii, and wherein at least one of the following conditions is true: (i) the information layer has a coercivity that varies by no more than about 5% between the first and second disk radii; and (ii) the stabilizing lower magnetic layer has a magnetic anisotropy energy lower than $1.0 \times 10^6$ erg/cm$^3$.

2. The disk of claim 1, wherein a first thickness of the lower magnetic layer at the first disk radius is less than a second thickness of the lower magnetic layer at the second disk radius.

3. The disk of claim 2, wherein the thickness of the upper magnetic layer is uniform between the first and second disk radii.

4. The disk of claim 1, wherein the Mrt at the first disk radius is no more than about 93% of the Mrt at the second disk radius.

5. The disk of claim 4, wherein the upper and lower magnetic layers are ferromagnetically exchange coupled and wherein the first disk radius is located closer to the inner periphery of the disk than the second disk radius.

6. The disk of claim 5, wherein the lower magnetic layer has an Mrt at the first disk radius that is at least no more than about 93% of the lower magnetic layer's Mrt at the second disk radius and wherein the coercivity of the information layer at the second disk radius is no more than the information layer coercivity at the first disk radius.

7. The disk of claim 4, wherein the upper and lower magnetic layers are antiferromagnetically exchange coupled and wherein the first disk radius is located further from the outer periphery of the disk than the second disk radius.

8. The disk of claim 1, wherein the Mrt of the upper magnetic layer varies by no more than about 10% between the first and second disk radii.

9. The disk of claim 1, wherein a magnetic remanence of the lower magnetic layer varies by no more than about 10% between the first and second disk radii.

10. The disk of claim 1, wherein condition (i) is true.

11. The disk of claim 1, wherein condition (ii) is true.

12. The disk of claim 1, wherein the Mrt varies linearly between the first and second radii.

13. The disk of claim 1, wherein the Mrt varies in a curvilinear manner between the first and second radii.

14. A magnetic disk for information storage, comprising:
(a) a substrate;
(b) an information layer for containing information, the information layer comprising an upper and a lower magnetic layer, wherein the information layer has a remanence-squareness-thickness-product ("Mrt") that varies radially between first and second disk radii, and wherein the information layer has a coercivity that varies by no more than about 5% between the first and second disk radii.

15. The disk of claim 14, wherein a first thickness of the lower magnetic layer at the first disk radius is less than a second thickness of the lower magnetic layer at the second disk radius.

16. The disk of claim 15, wherein the thickness of the upper magnetic layer is uniform between the first and second disk radii.

17. The disk of claim 14, wherein the Mrt at the first disk radius is no more than about 93% of the Mrt at the second disk radius.

18. The disk of claim 17, wherein the upper and lower magnetic layers are ferromagnetically exchange coupled and wherein the first disk radius is located farther from the outer periphery of the disk than the second disk radius.

19. The disk of claim 18, wherein the lower magnetic layer has an Mrt at the first disk radius that is no more than about 93% of the lower magnetic layer's Mrt at the second disk radius.

20. The disk of claim 17, wherein the upper and lower magnetic layers are antiferromagnetically exchange coupled and wherein the first disk radius is located farther from the outer periphery of the disk than the second disk radius.

21. The disk of claim 14, wherein the Mrt of the upper magnetic layer varies by no more than about 10% between the first and second disk radii.

22. The disk of claim 14, wherein a magnetic remanence of the lower magnetic layer varies by no more than about 10% between the first and second disk radii.

23. The disk of claim 14, wherein the coercivity of the information layer ranges from about 2,000 to about 6,000 Oe.

24. The disk of claim 14, wherein the lower magnetic layer has a magnetic anisotropy, energy of no more than about $1.0 \times 10^6$ erg/cm$^3$.

25. A magnetic disk for information storage, comprising:
(a) a substrate;
(b) an information layer for containing information, the information layer comprising an upper and a lower magnetic layer, wherein the information layer has a remanence-squareness-thickness-product ("Mrt") that varies radially between first and second disk radii, and wherein the information layer has a coercivitity that ranges from about 2,000 to about 6,000 Oe and a first coercivity at the first disk radius differs no more than about 5% from a second coercivity of the second disk radius.

* * * * *

UNITED STATES PATENT AND TRADEMARK OFFICE
CERTIFICATE OF CORRECTION

PATENT NO. : 7,592,079 B1  Page 1 of 1
APPLICATION NO. : 10/884789
DATED : September 22, 2009
INVENTOR(S) : Acharya et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1222 days.

Signed and Sealed this

Twenty-first Day of September, 2010

David J. Kappos
*Director of the United States Patent and Trademark Office*